United States Patent

[11] 3,612,740

| [72] | Inventors | Adam Gierek<br>Katowice;<br>Leopold Juszczyk, Katowice; Filip Meder, Zabrze, all of Poland |
|---|---|---|
| [21] | Appl. No. | 789,499 |
| [22] | Filed | Jan. 7, 1969 |
| [45] | Patented | Oct. 12, 1971 |
| [73] | Assignee | Huta Zabrze<br>Zabrze, Poland |
| [32] | Priority | Jan. 8, 1968 |
| [33] | | Poland |
| [31] | | P124569 |

[54] ARRANGEMENT FOR PRODUCTION OF METAL ALLOYS STEEL ALLOYS IN PARTICULAR
4 Claims, 2 Drawing Figs.

[52] U.S. Cl. .................................................. 13/9, 266/9
[51] Int. Cl. ........................................................ F27b 3/06, F27b 19/00
[50] Field of Search ................................................ 13/9, 9 X, 21, 21 X, 1, 2, 31, 34, 33; 75/10; 266/9, 11

[56] References Cited
UNITED STATES PATENTS

| 1,080,807 | 12/1913 | Benjamin | 13/1 |
| 794,255 | 7/1905 | Saunders | 13/21 |
| 2,368,998 | 2/1945 | Nissim | 13/9 |
| 2,931,708 | 4/1960 | Aamot | 13/21 X |
| 3,404,209 | 10/1968 | Brooke | 13/9 X |
| 3,444,304 | 5/1969 | Longenecker | 13/9 |
| 3,371,140 | 2/1968 | Wynne | 13/9 |
| 1,626,263 | 4/1927 | Brooke | 13/34 X |
| 1,645,119 | 10/1927 | Steenstrup | 13/1 UX |
| 2,694,097 | 11/1954 | Collin | 13/2 X |
| 3,163,520 | 12/1964 | Collin et al. | 13/33 X |
| 3,379,815 | 4/1968 | Parker | 13/2 |

*Primary Examiner*—Bernard A. Gilheany
*Assistant Examiner*—R. N. Envall, Jr.
*Attorney*—Irvin A. Lavine

ABSTRACT: Apparatus for producing metal alloys including a plurality of furnaces mounted for movement past a series of stations, at which there are a preheating burner, electrodes for melting a charge and electrodes for refining the charge.

PATENTED OCT 12 1971 3,612,740

ARRANGEMENT FOR PRODUCTION OF METAL ALLOYS STEEL ALLOYS IN PARTICULAR

Heretofore, producers of metals and electrosteel in particular have used the known type electric furnaces that operated with the successive steps of charging, preheating and melting, the further step of steel refining and pouring this steel into ladles. As a result of this known practice, this process, there are such drawbacks as exposure of the electrodes at the beginning of the process, i.e. during the preheating of the cold charge, to high temperature variations which fact negatively influences their operating life.

The melting of the charge proceeds with the transformer under full-load and takes a relatively short time, whereas the refining process requires a low load to be applied and power factor cos Φ is worsened with the resulting need for operation with the use of reactors. The brickwork of the furnace arches is exposed to frequent and marked temperature variations which shortens its life, and the nonutilized process heat is considered as completely lost. There are also known combined processes in which more than one device is used, for example the duplex or the triplex process. In these processes, the metal is poured over from one furnace to another by means of ladles. Also to be noted is the method where melting is done in converters and refining in arc furnaces. These methods exhibit such imperfections as high heat losses, a relatively low coefficient of utilization of costly equipment, temperature variations at the transfer of liquid steel, as well as hardships connected with the transfer of steel itself.

The object of this invention is the process of obtaining metal alloys and electro steel or its alloys in particular, by passing the charge through its various subsequent stages, as charging, preheating, melting, refining and so on without pouring over the molten metal at various stations with a due consequent economy of heat and electric energy resulting therefrom.

This object has been achieved by seating two or more furnace-tanks on a rotary or moving platform to perform each separate process at an individual station, whereby the arches of furnaces and the electrodes remain unchanged in their fixed working positions, being mounted independently of the platform.

Such design will be capable of ensuring a uniform partial technology for the whole melt process thus providing identical or almost identical permanent working conditions under furnace arches; this in effect will reduce the loading of furnace arches due to heat strokes thereby extending also their operating life. The melting process, separated from the refining process, will allow for the employment of two different capacity transformers with simultaneous stability as regards their full-load operation. This as a consequence will improve the power factor cos Φ by reducing the cumulative capacity of transformers, lowering their power consumption index and rendering possible their operation without the use of reactors. Simultaneously, the separation of the charging process with the preheating of the charge will enable the producer to make full use of the furnace gases and to utilize at further stations the heat deriving from waste gases; this will provide in consequence an improvement of the heat consumption coefficient per unit of steel produced. The separation of stations will moreover permit an easy replacement of individual tanks in case of overhaul or repair; the same improvement will also extend to the working conditions of personnel by providing better access to the point of charging, by enabling a better use of individual installation elements, and also by making the automatic control of furnace operation easier. Also the service conditions will thus undergo a change since the possibility will be created for an easier changeover from one steel grade to another; this will apply in particular to smaller quantities of steel produced. Such a production process will also account for more production cycles by cutting down their time from 2–4 hours to 1–1.5 hours, thus raising the aforementioned coefficient of equipment utilization.

For its better understanding the invention will now be more fully explained by reference to an exemplary embodiment in the accompanying drawings, where:

Figure 1:
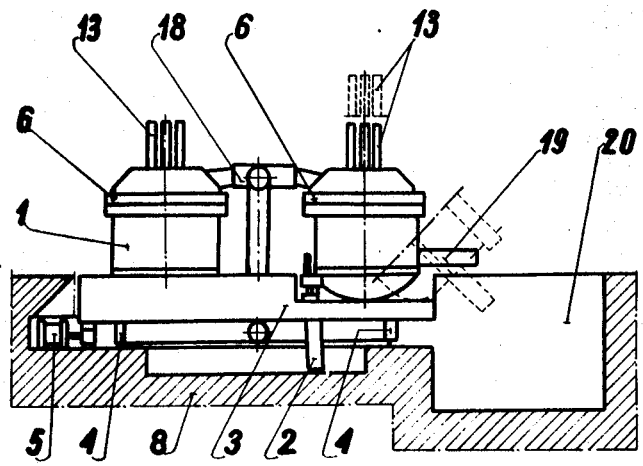
FIG. 1 shows a side view of the installation with a partial cutaway view of the foundation.
Figure 2:
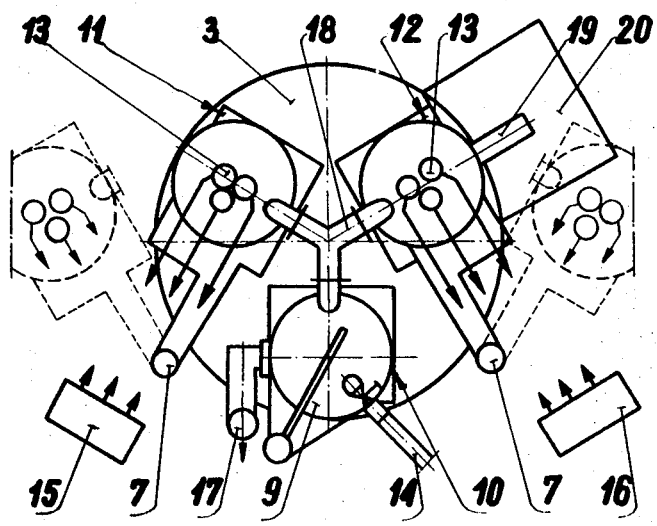
FIG. 2 shows a top view of the installation.

The arrangement for the production of electrosteel according to the invention is made up of two or more known type arc furnaces 1 preferably of the tiltable design with known tilting drives 2, mounted on a preferably rotary-type platform 3 with drive wheels 4 rolling on a rail. Said platform 3 is rotatable by means of known driving gear 5, preferably of the rack-and-pinion type. Furnace arches 6 and 9 are adjustable vertically, or preferably adjustable vertically and movable horizontally and supported on a rotary bracket 7 seated on foundation 8. In the furnace arches there are made at stations 11 and 12 the known type apertures for receiving electrodes 13, while in arch 9 at initial station 10 there are provided openings for preheat burners 14. At station 11, the furnace 1 has heavier-guage electrodes 13 and a transformer 15 bigger than the electrode 13 of furnace 1 at station 12 where the provided transformer 16 is about 50 percent smaller than the previous one.

To preheat steel at station 10 there is laid a pipeline 18 from the furnace at stations 11 and 12 by which pipeline the gases flow through the furnace at station 10 and along with the flue gases deriving from the combustion of gases in burner 14 are exhausted by flue 17 outside to a chimney. Pipelines 18 are connected to furnace 9 in a known separable manner not shown in the drawing.

To make rotations of furnace 1 easier the chute 19 of the rotary platform 3 is of the removable type. A discharge pit 20 is made in front of chute 19 adjacent to station 12.

The principle of operation of the arrangement according to the invention is as follows: At station 10 the brickwork of said furnace 1 is repaired and the furnace charged; then after closing the arch 9 burner 14 is put into operation to preheat the charge to a temperature of about 700° C. After preheating, said furnace 1 is moved from station 10 to station 11, the electrodes 13 are energized and there follows the process of melting and oring down the heat with possible partial refining of steel; then said furnace 1 is moved from station 11 to station 12 and by means of electrodes 13 of station 12 the steel is refined until tapping.

After setting the installation according to the present invention into operation, all three stages of the process proceed simultaneously i.e. at station 10 the furnace is charged and heated, at station 11 the charge is molten and at station 12 the charge is refined and tapped. This new type of arrangement allows for the application of most up-to-date refining and other processes.

For instance, it is possible to use a liquid refined charge at station 10 and then the burner 14 becomes then superfluous for its place will be taken by the oxygen lance, and under these circumstances there becomes superfluous also one of the further stations as for instance melting station 11.

We claim:
1. Apparatus for the production of metal alloys comprising:
 a. a plurality of furnaces,
 b. means for supporting and moving said furnaces along a predetermined path,
 c. electric means at at least one station along said path for melting material in a furnace at said station,
 d. arch means for said furnaces located at each station along said path,
 e. means for moving said arch means to and from operative position with a said furnace at each said station,
 f. and conduit means for conducting gases from a furnace in which material is being melted to a furnace at a station ahead thereof, said conduit means extending directly between the arch means at said stations.

2. The apparatus of claim 1, there being three said furnaces, electric heating means at the second and third stations, and said conduit means conducting gases from said second and third stations to arch means at a first station.

3. The apparatus of claim 1, wherein said means for supporting and moving said furnaces comprises a rotary platform, and said means for moving said arch means comprises support means exteriorly of said platform.

4. The apparatus of claim 3, wherein said means for moving said arch means comprises rotary brackets positioned exteriorly of said platform for swinging said arch means, and means for vertically moving said arch means.